US011262083B2

(12) United States Patent
Joyner, Jr. et al.

(10) Patent No.: US 11,262,083 B2
(45) Date of Patent: Mar. 1, 2022

(54) FREEZE PROTECTED CONDENSATE SYSTEM

(71) Applicant: Allied Air Enterprises Inc., West Columbia, SC (US)

(72) Inventors: George L. Joyner, Jr., Florence, SC (US); Randall Moody, Aiken, SC (US); Jeff Gedcke, Gilbert, SC (US); Mark Rakowski, Wagener, SC (US)

(73) Assignee: Allied Air Enterprises Inc., West Columbia, SC (US)

( * ) Notice: Subject to any disclaimer, the term of this patent is extended or adjusted under 35 U.S.C. 154(b) by 42 days.

(21) Appl. No.: 17/004,232

(22) Filed: Aug. 27, 2020

(65) Prior Publication Data

US 2020/0393139 A1     Dec. 17, 2020

Related U.S. Application Data

(63) Continuation of application No. 16/178,811, filed on Nov. 2, 2018, now Pat. No. 10,865,996.

(51) Int. Cl.
| | |
|---|---|
| *F24D 9/00* | (2006.01) |
| *F16T 1/12* | (2006.01) |
| *F16T 1/38* | (2006.01) |
| *F24H 8/00* | (2006.01) |
| *F24D 19/00* | (2006.01) |

(52) U.S. Cl.
CPC .......... *F24D 19/0095* (2013.01); *F16T 1/12* (2013.01); *F16T 1/38* (2013.01); *F24H 8/006* (2013.01)

(58) Field of Classification Search
CPC .......... F24D 19/0095; F16T 1/12; F16T 1/38; F24H 8/006
See application file for complete search history.

(56) References Cited

U.S. PATENT DOCUMENTS

| | | | |
|---|---|---|---|
| 4,630,633 | A | 12/1986 | Vallery |
| 4,856,550 | A | 8/1989 | Smelcer |
| 5,379,749 | A | 1/1995 | Rieke et al. |
| 5,704,343 | A | 1/1998 | Ahn et al. |
| 5,775,318 | A | 7/1998 | Haydock et al. |
| 5,992,436 | A | 11/1999 | Hellman et al. |
| 7,905,202 | B2 | 3/2011 | Young |
| 8,056,553 | B2 | 11/2011 | Khan |
| 8,931,438 | B2 | 1/2015 | Walters et al. |
| 9,074,791 | B2 | 7/2015 | Rieke et al. |
| 9,696,055 | B1 | 7/2017 | Goodman et al. |
| 2015/0241083 | A1 | 8/2015 | Rakowski et al. |

*Primary Examiner* — Kevin R Barss
(74) *Attorney, Agent, or Firm* — Shackelford, Bowen, McKinley & Norton, LLP

(57) ABSTRACT

A condensate trap for a furnace system includes a trap inlet configured to receive combusted gases, a condensate chamber coupled to the trap inlet and configured to trap condensate, a trap outlet coupled to the condensate chamber and configured to exhaust the combusted gases, a header box inlet configured to receive condensate from a header box, and a condensate outlet configured to drain condensate from the condensate chamber. Combusted gas that passes through the condensate trap provides heat to condensate within the condensate trap to thaw frozen condensate or to prevent condensate from freezing.

20 Claims, 9 Drawing Sheets

FREEZE PROTECTED CONDENSATE SYSTEM

CROSS-REFERENCE TO RELATED APPLICATION

This application is a continuation of U.S. patent application Ser. No. 16/178,811, filed on Nov. 2, 2018. U.S. patent application Ser. No. 16/178,811 is incorporated herein by reference.

TECHNICAL FIELD

The present invention relates generally to system and method of operating a heating system and more particularly, but not by way of limitation, to a system and method for draining condensate from a heating unit. The system and method also thaw frozen condensate and/or prevent condensate within the heating unit from freezing.

HISTORY OF RELATED ART

During operation of heating systems, condensate is sometimes formed inside a condensing furnace heat exchanger. Under certain conditions, condensate forms as a by-product of the combustion process. Formation of condensate within the heating system can cause various problems including corrosion and blockages within the heating system. Some heating systems are installed in locations that experience sub-freezing ambient conditions. For example, in places with particularly cold winters (e.g., northern parts of the United States and Canada) heating systems sometimes experience freezing temperatures in which condensate within the heating system can freeze. When the condensate freezes in the heating system, the frozen condensate can create blockages that prevent the heating system from operating correctly.

In particularly cold climates, the decision is often made to use an 80% efficient gas system. Using an 80% efficient gas system keeps exhaust temperatures above the dew point of combustion gasses to avoid formation of condensate. While this method may be effective to prevent condensate from freezing within the heating system, it wastes a significant amount of heating energy compared to 90%-plus efficient gas systems. Another method that is used to combat the problem of freezing condensate is the use of electric heat tape that is wrapped around components of the heating system to keep the components of the heating system warm to prevent freezing.

BRIEF SUMMARY OF THE INVENTION

An example of a condensate trap for a furnace system includes a trap inlet configured to receive combusted gases, a condensate chamber coupled to the trap inlet and configured to trap condensate, a trap outlet coupled to the condensate chamber and configured to exhaust the combusted gases, a header box inlet configured to receive condensate from a header box, and a condensate outlet configured to drain condensate from the condensate chamber. Combusted gas that passes through the condensate trap provides heat to condensate within the condensate trap to thaw frozen condensate or to prevent condensate from freezing.

An example of a furnace system includes a burner, a combustion air inducer configured to receive combusted gases from the burner, an outlet pipe configured to receive the combusted gases from the combustion air inducer, a condensate trap configured to receive the combusted gases from the outlet pipe and to trap condensate present in the combusted gases, and an exhaust pipe coupled to the condensate trap.

An example of a method of removing condensate from a furnace system includes determining, via a controller comprising a processor and memory, if a temperature of an enclosed space is below a set-point temperature of a thermostat. Responsive to a determination that the temperature of the enclosed space is below the set-point temperature of the thermostat, burning a fuel with a burner of the furnace system to provide heat to the enclosed space, the burning creating a combusted gas. The method also includes exchanging heat between air for the enclosed space and the combusted gas, flowing the combusted gas through a condensate trap. The condensate trap includes a trap inlet configured to receive combusted air, a condensate chamber coupled to the trap inlet and configured to trap condensate, a trap outlet coupled to the condensate chamber and configured to exhaust combusted air, a header box inlet configured to receive condensate from a header box of the furnace system, a condensate outlet configured to drain condensate from the condensate chamber. The method also includes draining condensate from the condensate trap, and wherein the combusted gas provides heat to the condensate trap to warm condensate within the condensate trap.

DETAILED DESCRIPTION OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
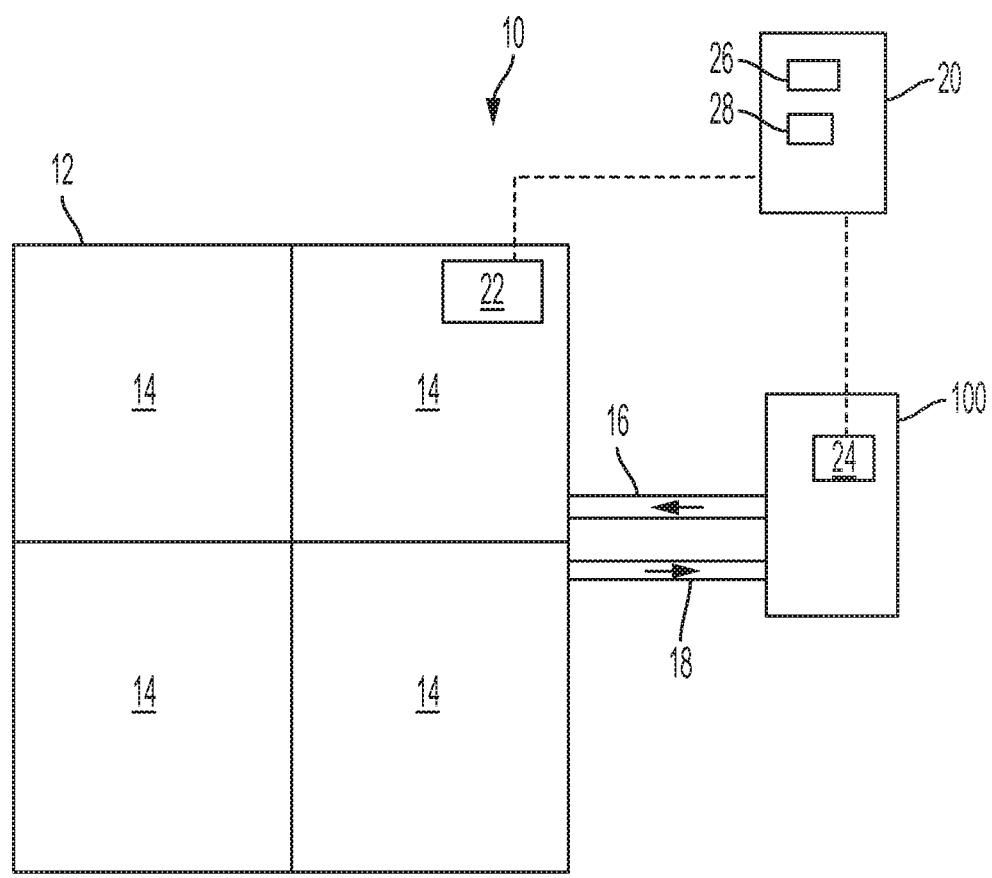
FIG. 1 is a system diagram of an illustrative heating system.

FIG. 1 is a system diagram of an illustrative heating system 10. Heating system 10 includes an enclosed space 12 that receives conditioned air from a heating unit 100. Air is provided from heating unit 100 to enclosed space 12 via a conduit 16 and is returned to heating unit 100 via a return conduit 18. In some embodiments, enclosed space 12 may be divided into multiple subspaces 14. Subspaces 14 may be rooms of a single dwelling or office building or may be separate dwellings (e.g., multifamily units of an apartment complex or the like). Examples of enclosed spaces 12 include apartment complexes, industrial parks, and commercial office parks. In heating system 10, heating unit 100 is located outside enclosed space 12 and heating unit 100 is subject to ambient temperatures. In some embodiments, heating unit 100 may be a part of a Heating, Ventilation, and Air Conditioning (HVAC) system that includes a condenser coil, an evaporation coil, and a compressor.

Heating system 10 includes a controller 20 that controls heating unit 100. One or more thermostats 22 may be placed within enclosed space 12. In an illustrative embodiment, controller 20 comprises a computer that includes components for controlling and monitoring heating system 10. For example, controller 20 comprises a CPU 26 and a memory 28. In an illustrative embodiment, the controller 20 is in communication with thermostat 22 that allows a user to input a desired temperature for the enclosed space 12. Controller 20 may be an integrated controller or a distributed controller that directs operation of heating system 10. In an illustrative embodiment, controller 20 includes an interface to receive, for example, thermostat calls, temperature setpoints, blower control signals, environmental conditions, and operating mode status for heating system 10.

Each thermostat 22 provides information to controller 20. For example, each thermostat 22 can provide information regarding temperature within enclosed space 12 and a setpoint temperature. The set-point temperature is the desired temperature for an enclosed space. Heating system 100 provides heat to enclosed space 12 to keep the temperature of enclosed space 12 close to the set-point temperature. In some embodiments, heating unit 100 includes one or more sensors 24 that provide data to controller 20 about the operation of heating unit 100. For example, the one or more sensors 24 can be a pressure switch, temperature sensor, humidity sensor, and the like. In some embodiments, sensor 24 is a pressure switch that provides data regarding pressure of exhaust gasses to controller 20. Based on the data regarding pressure, controller 20 can determine if a blockage exists within heating unit 100. In some embodiments, pressure switch 24 is a mechanical switch that creates an open circuit to shut down heating unit 100 when exhaust gas pressure falls below a threshold value of the pressure switch 24.

Figures 2A, 2B:
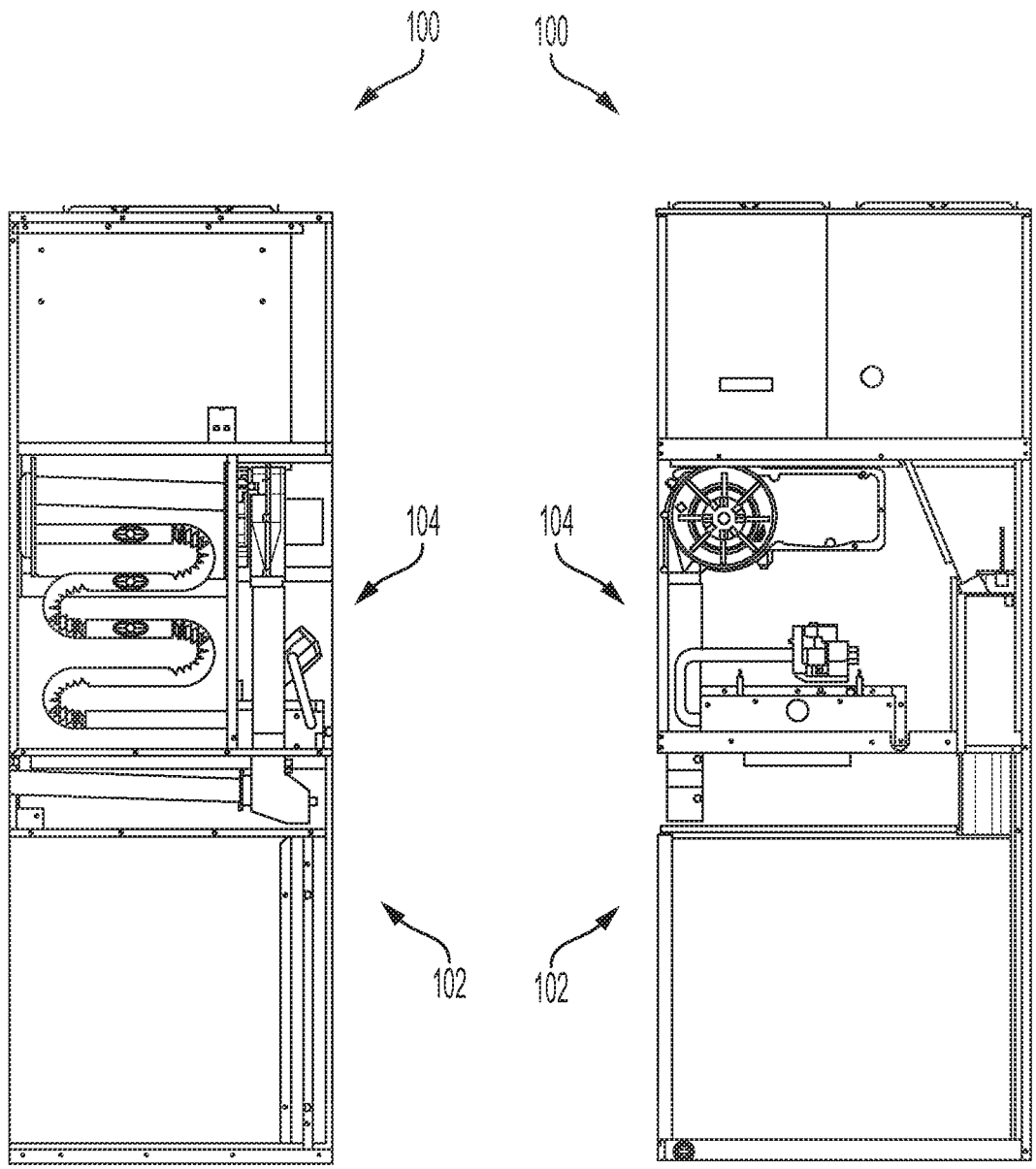
FIGS. 2A and 2B are side and front views, respectively, of an illustrative heating unit.

FIGS. 2A and 2B are side and front views, respectively, of heating unit 100.

Heating unit 100 includes a housing 102 that houses a furnace system 104. In the embodiment shown in FIGS. 2A and 2B, no air conditioning components are shown. In other embodiments, air conditioning components can be included within housing 102. In an illustrative embodiment, heating unit 100 is installed in a location that experiences freezing ambient temperatures. For example, heating unit 100 is sometimes installed exterior to enclosed space 12 to which heating and cooling is provided. In these instances, heating unit 100 is often subject to harsher temperatures than when heating unit 100 is installed in the interior of a building. During winter months, heating unit 100 can experience freezing temperatures. When freezing temperatures are experienced, condensate within the heating unit 100 may freeze. In some instances, frozen condensate can form blockages that prevent proper airflow through heating unit 100, and in particular through furnace system 104.

In some embodiments, furnace system 104 is a 90%-plus efficient gas furnace (i.e., 90%+ of the BTUs of gas input to the system is converted to heat). 90%-plus efficient gas furnaces exhaust combusted gas (sometimes referred to as flu gas) at temperatures between around 95-120° F. 80% efficient gas furnaces output combusted gas at temperatures between around 300-400° F. In comparison. 90%-plus efficient gas furnaces capture more energy from the combusted gases than 80% efficient gas furnaces, which causes the lower exhaust temperature. Generally speaking, capturing more energy from the combusted gases is desirable because capturing more energy from the combusted gases results in more efficient heating of enclosed space 12. However, the lower exhaust temperatures of 90%-plus efficient gas furnaces can result in increased condensate formation as the lower exhaust temperatures increase the likelihood that the temperature of the combusted gases falls below the dew point temperature of the combusted gases. When the temperature of the combusted gases falls below the dew point temperature, condensate is formed within the combusted air. For heating units 100 installed in locations that experience freezing temperatures, the condensate can freeze and cause problems for the operation of heating unit 100.

Figure 3:
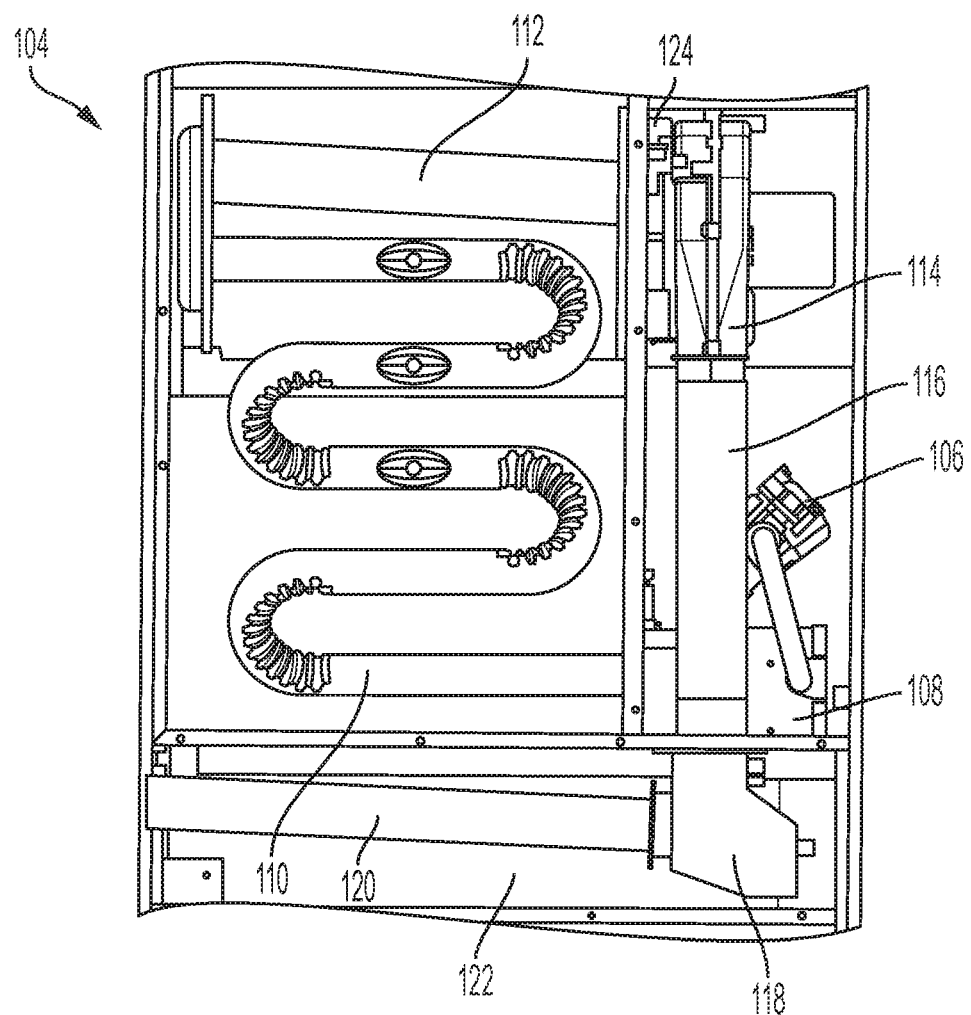
FIG. 3 is a close-up view of a furnace system of the illustrative heating unit of FIGS. 2A and 2B.

Referring now to FIG. 3, a close-up view of furnace system 104 of illustrative heating unit 100 of FIGS. 2A and 2B is shown. Furnace system 104 includes a valve 106 that supplies fuel (e.g., gas) to a burner 108. Burner 108 exhausts combusted air to a primary heat exchanger 110. A secondary heat exchanger 112 collects combusted air from primary heat exchanger 110. A combustion air inducer 114 is a fan that draws combusted air from secondary heat exchanger 112 and pumps the combusted air through an outlet pipe 116. Outlet pipe 116 is positioned within housing 102 and directs air from combustion air inducer 114 to condensate trap 118. Positioning outlet pipe 116 within housing 102 provides some insulation from ambient temperatures. Condensate trap 118 is designed to collect condensate in the combusted air. Operation of condensate trap 118 will be discussed in more detail below. Combusted air passes through condensate trap 118 and exits furnace system 104 through exhaust pipe 120.

As illustrated in FIG. 3, condensate trap 118 and exhaust pipe 120 positioned within a compartment 122. For installations where heating unit 100 is placed outside, compartment 122 can experience temperatures that are the same or close to the same as the ambient temperature that surrounds heating unit 100. In particularly cold climates, compartment 122 can experience sub-freezing temperatures, which can result in the freezing of condensate within condensate trap 118 and exhaust pipe 120.

In the presence of freezing ambient temperatures, condensate can form in the combusted air if the temperature of the combusted air falls below the dew point temperature. In some embodiments, a temperature of the combusted air falls below the dew point temperature within secondary heat exchanger 112. Condensate can begin to form within secondary heat exchanger 112, but can also form downstream in combustion air inducer 114 and outlet pipe 116. Some of the condensate that forms within secondary heat exchanger 112 is collected in a header box 124. Header box 124 includes an inlet to receive condensate from secondary heat exchanger 112. As illustrated in FIG. 3, secondary heat exchanger 112 is set at an angle that tilts down toward header box 124 to urge condensate that has formed on walls of secondary heat exchanger 112 to settle into header box 124. Header box 124 also includes an outlet that is coupled to condensate trap 118. Under normal operating conditions, condensate from header box 124 is drawn into condensate trap 118 by a negative pressure created by suction of the combustion air inducer 114.

Figure 4:
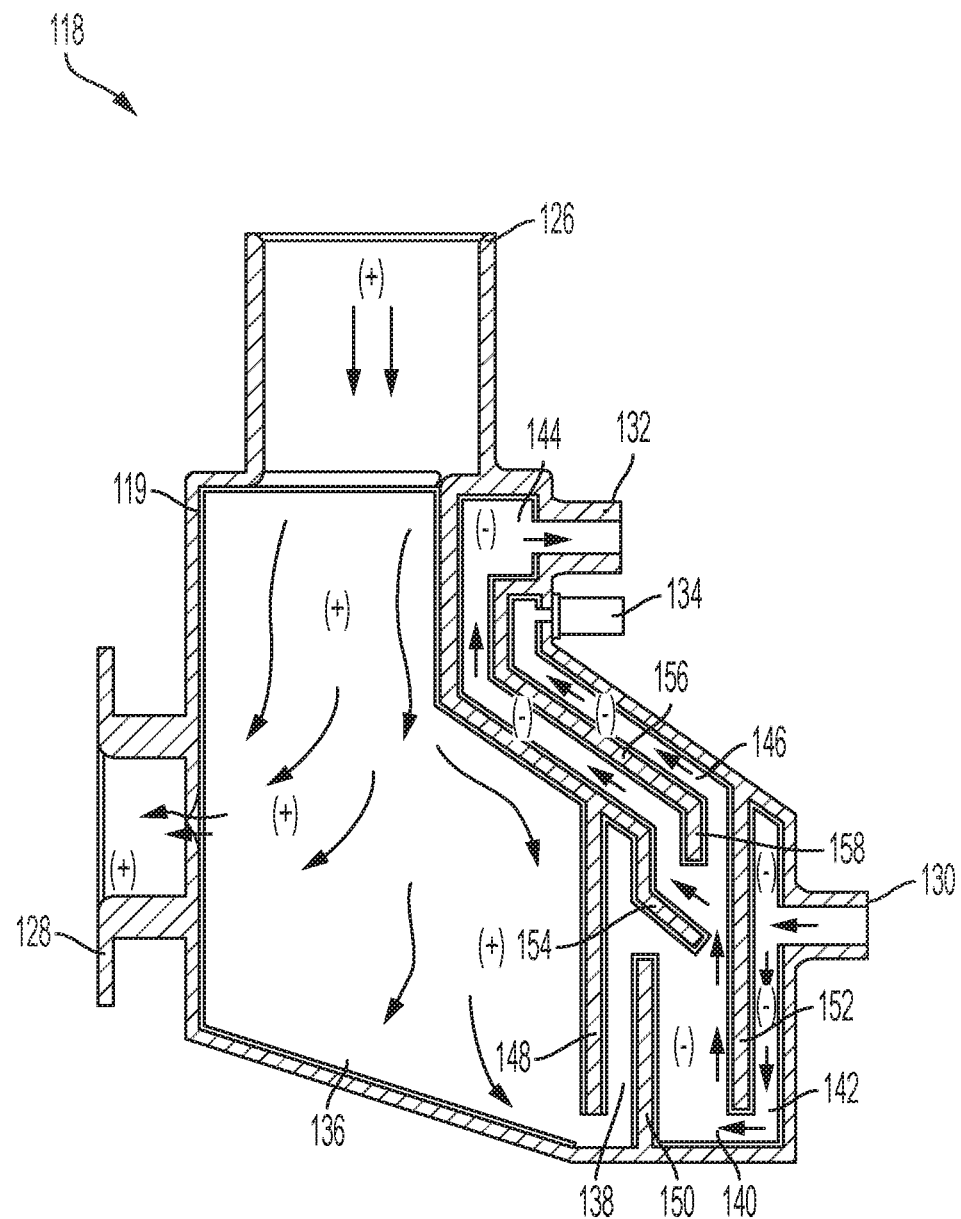
FIG. 4 is a side view of an illustrative condensate trap.

Referring now to FIG. 4, a side view of condensate trap 118 is shown. FIG. 4 will be discussed relative to FIGS. 1-3 above Condensate trap 118 includes a trap inlet 126 that receives combusted air from outlet pipe 116 and a trap outlet 128 that exhausts combusted air from condensate trap 118. Condensate trap 118 also includes a condensate outlet 130, a header box inlet 132, and a pressure switch connection 134. Condensate outlet 130 allows condensate that has collected in condensate trap 118 to drain out of condensate trap 118. In some embodiments, a drain hose is connected to condensate outlet 130 to guide condensate away from heating unit 100. Header box inlet 132 is configured to receive condensate from header box 124. A hose or pipe couples header box 124 to header box inlet 132 and provides a negative pressure to condensate trap 118 because header box 124 is located on an upstream side of combustion air inducer 114. Pressure switch connection 134 is a port that is configured to allow a pressure sensor to connect to condensate trap 118 to monitor pressure within condensate trap 118.

Condensate trap 118 includes a condensate chamber 119 that is made up of multiple chambers. Condensate chamber 119 comprises a positive-pressure side and a negative-pressure side. The positive-pressure side is coupled to a downstream side of the combustion air inducer 114 and comprises chambers 136 and 138. The negative-pressure side is coupled to an upstream side of combustion air inducer 114 and comprises chambers 140, 142, 144, and 146. Chambers 136, 138, 140, 142, 144, and 146 are defined by walls 148, 150, 152, 154, and 156. In some embodiments, walls of chambers 136, 138, 140, 142, 144, and 146 include materials and/or textures similar to those used in ice trays to promote a quick release of any condensate that has frozen thereto. Operation of condensate trap 118 is discussed in more detail below relative to FIGS. 5-7.

Figure 5:
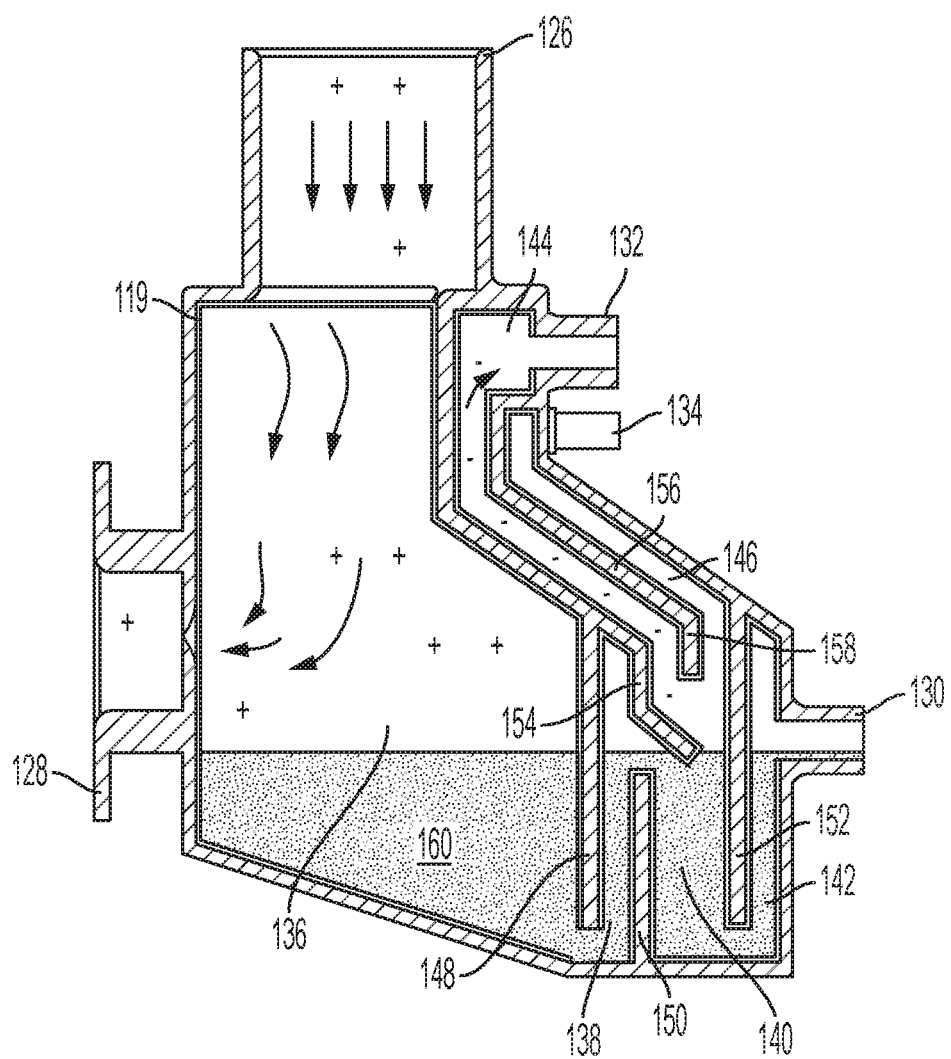
FIGS. 5-7 are side views of the illustrative condensate trap during various operating conditions.

Referring now to FIG. 5, condensate trap 118 is shown with condensate 160 pooled in condensate trap 118. FIG. 5 will be discussed relative to FIGS. 1-4 above. As illustrated in FIG. 5, condensate 160 within condensate trap 118 has collected to the point where a level of condensate 160 has reached a level of condensate outlet 130. At this level, condensate 160 separates condensate trap 118 into the positive-pressure side and the negative-pressure side. The positive-pressure side comprises chamber 136 and the negative-pressure side comprises chambers 144 and 146. The positive pressure in chamber 136 is a result of chamber 136 being downstream of combustion air inducer 114 and the negative pressure in chambers 144 and 146 is a result of header box inlet 132 being coupled to header box 124, which is upstream of combustion air inducer 114. When condensate 160 is at the level shown in FIG. 5, chamber 138 between walls 148 and 150 is filled with condensate 160 and provides a barrier that separates the positive-pressure and negative-pressure sides. During operation of furnace system 104, additional condensate 160 that settles within condensate trap 118 flows through chambers 136, 138, 140, and 142 and exits through condensate outlet 130.

As combusted air passes through condensate trap 118, heat within the combusted air warms condensate 160 in condensate trap 118 to prevent condensate 160 from freezing. In some embodiments, heating unit 100 uses a 90%-plus efficiency gas furnace and combusted air passes through condensate trap 118 at a temperature of around 95-120° F. In some embodiments, heating unit 100 uses an 80% efficiency gas furnace and combusted air passes through condensate trap 118 at a temperature of around 300-400° F. In some embodiments, condensate 160 may freeze within condensate trap 118 when heating system 10 is not operating. Frozen condensate 160 will melt once heating system 10 is powered back on and hot combusted gasses flow through condensate trap 118.

As illustrated in FIG. 5, trap outlet 128 is positioned so that during normal operating conditions (e.g., conditions shown in FIG. 5) the level of condensate 160 is just below the bottom of trap outlet 128. Trap outlet 128 and exhaust pipe 120 are set at an angle toward condensate trap 118 to direct condensate within exhaust pipe 120 back toward condensate trap 118.

Figure 6:
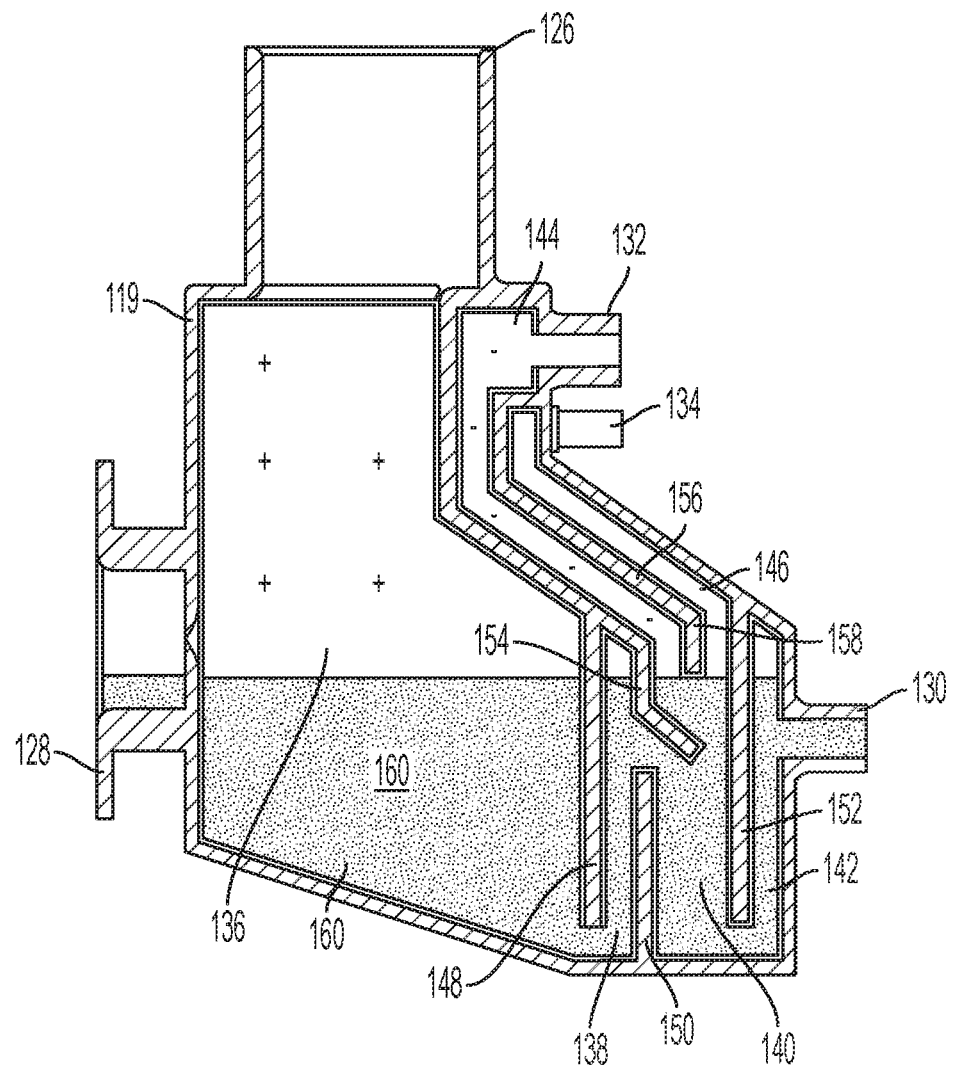

Referring now to FIG. 6, condensate trap 118 is shown in a blocked-drain condition. FIG. 6 will be discussed relative to FIGS. 1-5 above. In the blocked-drain condition, condensate outlet 130 has become fully or partially blocked and condensate 160 begins to accumulate within condensate trap 118 faster than it drains. If this condition is allowed to continue, condensate 160 will eventually build up to the level where condensate 160 begins to flow out of exhaust pipe 120. Allowing condensate 160 to flow out of exhaust pipe 120 is undesirable as it can lead to condensate freezing on an outside of heating system 10. To prevent this from occurring, condensate trap 118 is designed to detect a blocked-drain condition and shut down furnace system 104 to prevent additional condensate 160 from being generated.

Condensate outlet 130 can become blocked because condensate 160 within condensate outlet 130 or within a tube connected to condensate outlet 130 has begun to freeze or has completely frozen. When condensate outlet 130 becomes blocked, a level of condensate 160 within condensate trap 118 rises. If enough condensate 160 settles in condensate trap 118, the level of condensate 160 will rise to the level of an end portion 158 of wall 156 as illustrated in FIG. 6. With condensate 160 at this level, chamber 146 becomes cut off from chamber 144 and a pressure at pressure switch connection 134 changes and trips pressure switch 24 that is connected to pressure switch connection 134 to shut furnace system 104 off. In some embodiments, tripping pressure switch 24 alerts heating system 10 that a blocked-drain condition exists. Heating system 10 can then issue an alert to a user informing the user of the blocked-drain condition and remedial action can be taken to remove the blockage. In some instances, it may be necessary to perform maintenance on the blocked drain to remove the frozen condensate 160. In some embodiments, electrical heat tape can be positioned around condensate outlet 130 and/or the hose attached to condensate outlet 130. When a blocked outlet condition is detected by pressure switch 24, the electrical heat tape can be activated to melt the frozen condensate within condensate outlet 130 and/or the hose attached to condensate outlet 130.

Figure 7:
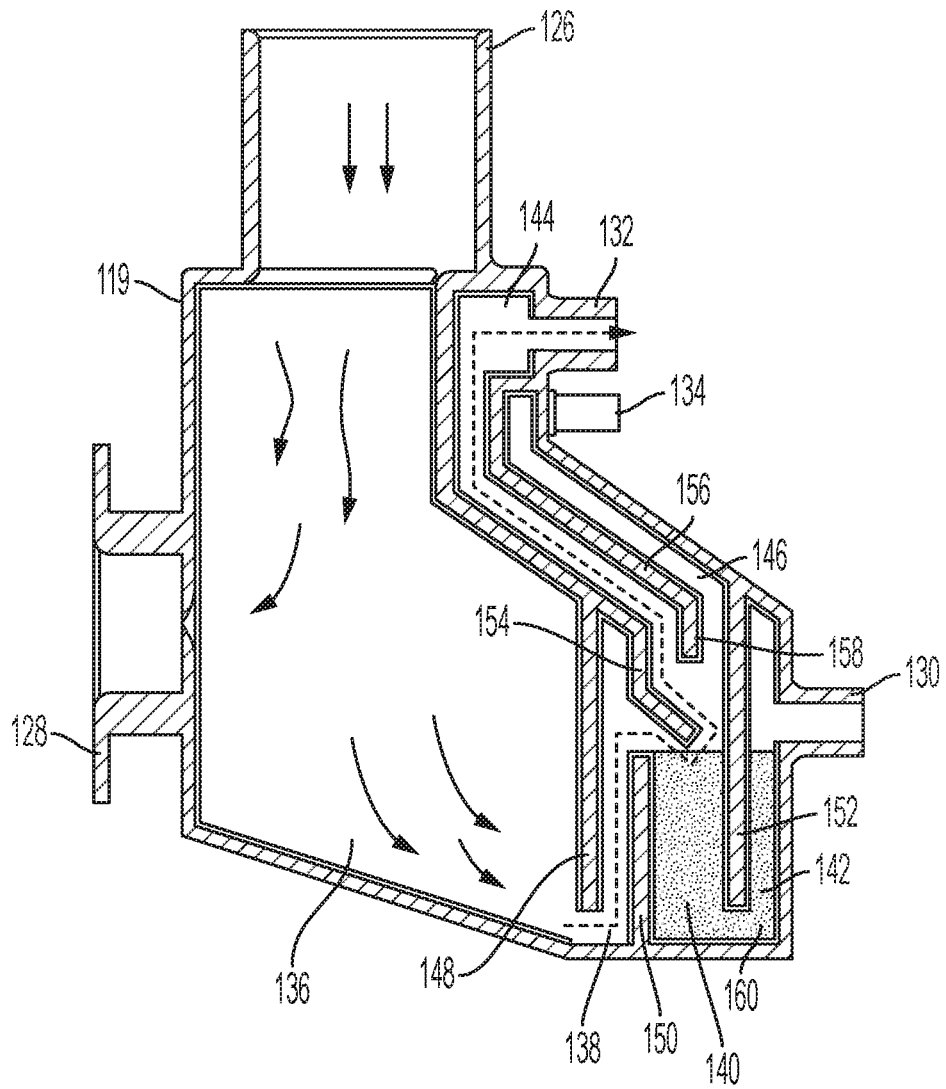

Referring now to FIG. 7, condensate trap 118 is shown in a blocked-outlet condition. In the blocked-outlet condition, exhaust pipe 120 has become blocked and combusted air from combustion air inducer 114 cannot exhaust out of heating system 10. Exhaust pipe 120 can become blocked for various reasons. Animals may have nested in exhaust pipe 120 or an outlet of exhaust pipe 120 may have become blocked by frozen condensate. When exhaust pipe 120 is blocked, the positive pressure of the combusted air forces condensate 160 out of chambers 136 and 138 and the combusted air is allowed to recirculate to combustion air inducer 114 through header box inlet 132. Allowing the combusted air to recirculate through header box inlet 132 prevents the combusted air from venting through condensate outlet 130. Recirculating also allows the height of condensate trap 118 to be smaller than if recirculation were not possible.

When the combusted air recirculates back to combustion air inducer 114, pressure at pressure switch connection 134 changes and pressure switch 24 connected to the pressure switch connection 134 detects the change in pressure. In some embodiments, controller 20 turns furnace system 104 off in responses to the change in pressure. In some embodiments, tripping pressure switch 24 alerts heating system 10 that a blocked-outlet condition exists. Heating system 10 can then issue an alert to a user informing the user of the blocked-outlet condition and remedial action can be taken. In some instances, it may be necessary to perform maintenance on the blocked exhaust outlet to remove the frozen condensate 160. In some embodiments, electrical heat tape can be positioned around the outlet and/or the exhaust pipe. When a blocked outlet condition is detected by pressure switch 24, the electrical heat tape can be activated to melt the frozen condensate.

Figure 8:
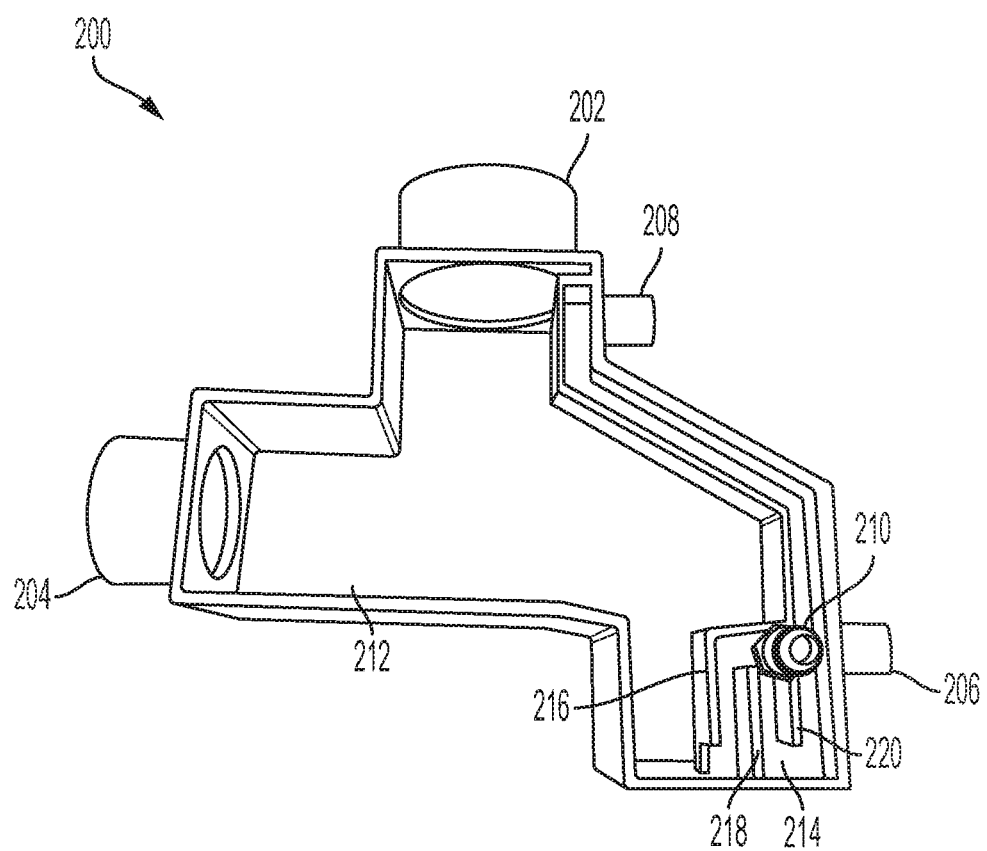
FIG. 8 is a side view of an illustrative condensate trap.

Referring now to FIG. 8, an alternative embodiment of a condensate trap 200 is illustrated. Condensate trap 200 can be used with heating unit 100 in place of condensate trap 118. Condensate trap 200 includes a trap inlet 202 that receives combusted air from outlet pipe 116 and a trap outlet 204 that exhausts combusted air from condensate trap 200. Condensate trap 200 also includes a condensate outlet 206, a header box inlet 208, and a pressure switch connection 210. Condensate outlet 206 allows condensate that has collected in condensate trap 200 to drain out of condensate trap 200. In some embodiments, a drain hose is connected to condensate outlet 206 to guide condensate away from heating unit 100. Header box inlet 208 is configured to receive condensate from header box 124. A hose or pipe couples header box 124 to header box inlet 208 and provides a negative pressure to condensate trap 200. Pressure switch connection 210 is configured to allow a pressure sensor to monitor pressure within condensate trap 200. An interior of condensate trap 200 includes multiple chambers. As illustrated in FIG. 8, condensate trap 200 includes chambers 212 and 214 defined by walls 216, 218, and 220. In some embodiments, walls of chambers 212 and 214 include materials and/or textures to promote a quick release of any condensate that has frozen thereto.

Condensate trap 200 operates similar to condensate trap 118. During normal operation, condensate collects in chamber 212 to the level of condensate outlet 206. If condensate collects within chamber 214 above the level of condensate outlet 206 (e.g., a blocked-drain condition), pressure at pressure switch connection 210 changes and a pressure switch coupled to pressure switch connection 210 is tripped to shut down furnace system 104.

Figure 9:
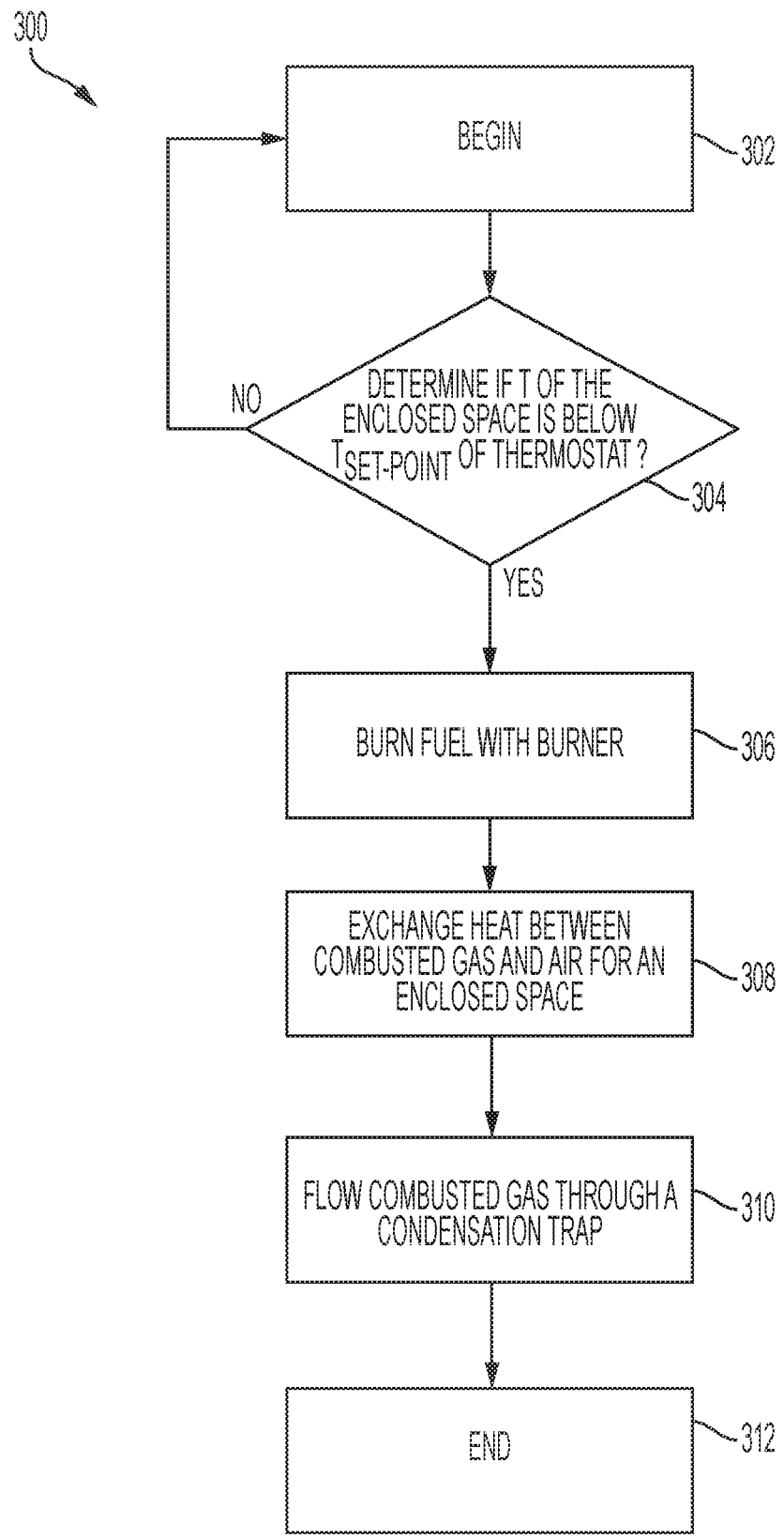
FIG. 9 is a flowchart of an illustrative method.

Referring now to FIG. 9, a method 300 of removing condensate from a furnace system is illustrated. Method 300 will be discussed relative to FIGS. 1-9 above. Method 300 begins at a step 302. At step 304, controller 20 determines if a temperature T of enclosed space 12 is below a set-point temperature $T_{set-point}$. In some embodiments, controller 20 uses information from thermostat 22 to determine if T is below $T_{set-point}$. If controller 20 makes a determination that T is below $T_{set-point}$, method 300 proceeds to step 306. If controller 20 makes a determination that T is not below $T_{set-point}$, method 300 returns to step 302. After controller 20 has instructed furnace system 104 to power on, method 300 proceeds to step 306.

At step 306, burner 108 burns fuel and generates heat and combusted gases. Method 300 then proceeds to step 308. At step 308, the combusted gases flow though primary heat exchanger 110 and exchange heat with air that passes over primary heat exchanger 110. The air that is heated by primary heat exchanger 110 is directed into enclosed space 12 to provide heat thereto. At step 310, the combusted gases pass through combustion air inducer 114 and are directed to condensate trap 118. Condensate within the combusted gases settle in condensate trap 118 and drain through condensate outlet 130. By the time the combusted gases enter condensate trap 118, a lot of the heat contained within the combusted gases has been lost to the air for enclosed space 12 and through other losses. However, the temperature of the combusted gases that pass through condensate trap 118 still typically exceeds 100° F. This heat is used to warm condensate 160 that is contained within condensate trap 118. In some embodiments, the heat from the combusted gases prevents condensate 160 from freezing. In some embodiments, the heat from the combusted gases is used to melt any frozen condensate 160 within condensate trap 118.

Method 300 ends at step 312. At step 312, controller 20 has determined that no additional heat is needed in enclosed space 12. For example, controller 20 has determined that T is above $T_{set-point}$. In some embodiments, controller 20 determines that no additional heat is needed in enclosed space 12 based upon information from thermostat 22.

In some embodiments, method 300 can include additional steps, including monitoring a pressure of condensate trap 118. For example, pressure switch 24 can monitor a pressure within condensate trap 118. When a change in pressure is detected, pressure switch 24 can create an open-circuit condition to cut power to furnace system 104 or provide a signal to controller 20 to inform controller 20 of the pressure change. Controller 20 may then power off furnace system 104 if necessary.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A condensate trap comprising:
   a trap inlet configured to receive combusted gases;
   a condensate chamber comprising a positive-pressure side and a negative-pressure side, wherein the condensate chamber is coupled to the trap inlet and;
   a trap outlet coupled to the condensate chamber,
   a header box inlet configured to receive condensate from a header box;
   a condensate outlet configured to drain condensate from the condensate chamber,
   wherein the negative-pressure side comprises:
     a first chamber coupled to the header box inlet;
     a second chamber coupled to a pressure switch connection; and
     a third chamber coupled to the condensate outlet.

2. The condensate trap of claim 1, wherein the condensate chamber is configured to trap condensate.

3. The condensate trap of claim 2, wherein the pressure switch connection is configured to monitor a pressure within the condensate chamber.

4. The condensate trap of claim 3, wherein the trap outlet is configured to exhaust the combusted gases.

5. The condensate trap of claim 1, wherein the second chamber comprises a wall with an end portion that is positioned at a level above a level of the condensate outlet.

6. The condensate trap of claim 5, wherein when a level of condensate reaches the end portion, a pressure at the pressure switch connection is different than a pressure at the header box inlet.

7. The condensate trap of claim 1, wherein a level of the condensate outlet is positioned below a level of the trap outlet.

8. The condensate trap of claim 1, further comprising a pressure switch coupled to the pressure switch connection.

9. The condensate trap of claim 8, wherein the pressure switch is configured to shut down a heating unit when a pressure at the header box inlet is different than a pressure at the pressure switch connection.

10. The condensate trap of claim 1, wherein the trap outlet is angled relative to the condensate chamber to cause condensate within the trap outlet to flow into the condensate chamber.

11. The condensate trap of claim 1, wherein when combusted air cannot flow through the trap outlet, the combusted air recirculates from the condensate chamber through the header box inlet.

12. A furnace system comprising:
    a burner,
    a combustion air inducer configured to receive combusted gases from the burner;
    an outlet pipe configured to receive the combusted gases from the combustion air inducer;
    a condensate trap configured to receive the combusted gases from the outlet pipe and to trap condensate present in the combusted gases, the condensate trap comprising a condensate chamber having a positive-pressure side and a negative-pressure side;
    an exhaust pipe coupled to the condensate trap;
    wherein the negative-pressure side comprises:
      a first chamber coupled to a header box inlet;
      a second chamber coupled to a pressure switch connection; and
      a third chamber coupled to a condensate outlet.

13. The furnace system of claim 12, wherein the condensate trap comprises:
    a trap inlet configured to receive the combusted gases;
    the condensate chamber coupled to the trap inlet and configured to trap condensate;
    a trap outlet coupled to the condensate chamber and configured to exhaust the combusted gases;
    the header box inlet configured to receive condensate from a header box of the furnace system; and
    the condensate outlet configured to drain condensate from the condensate chamber.

14. The furnace system of claim 13, wherein the pressure switch connection is configured to monitor a pressure within the condensate chamber of the condensate trap.

15. The furnace system of claim 13, wherein:
    the second chamber comprises a wall with an end portion that is above a level of the condensate outlet; and
    when a level of condensate reaches the end portion, a pressure at the pressure switch connection is different than a pressure at the header box inlet.

16. The furnace system of claim 13, wherein the outlet pipe is angled relative to the condensate chamber to cause condensate within the outlet pipe to flow into a condensate chamber of the condensate trap.

17. The furnace system of claim 13, further comprising a pressure switch coupled to the pressure switch connection.

18. A furnace system comprising:
    a burner,
    a combustion air inducer configured to receive combusted gases from the burner;
    an outlet pipe configured to receive the combusted gases from the combustion air inducer;
    a condensate trap configured to receive the combusted gases from the outlet pipe and to trap condensate present in the combusted gases, the condensate trap comprising a condensate chamber having a positive-pressure side and a negative-pressure side;
    an exhaust pipe coupled to the condensate trap;
    wherein the negative-pressure side comprises:
      a first chamber coupled to a header box inlet;
      a second chamber coupled to a pressure switch connection;
      a third chamber coupled to a condensate outlet; and
    wherein the second chamber comprises a wall with an end portion that is above a level of the condensate outlet.

19. The furnace system of claim 18, wherein the condensate trap comprises:
- a trap inlet configured to receive the combusted gases;
- a trap outlet coupled to the condensate chamber and configured to exhaust the combusted gases;
- the header box inlet configured to receive condensate from a header box of the furnace system; and
- the condensate outlet configured to drain condensate from the condensate chamber.

20. The furnace system of claim 19, wherein when combusted air cannot flow through the trap outlet, the combusted air recirculates from the condensate chamber through the header box inlet.

* * * * *